United States Patent
Beauchesne et al.

(10) Patent No.: US 9,602,533 B2
(45) Date of Patent: Mar. 21, 2017

(54) DETECTING NETWORK RECONNAISSANCE BY TRACKING INTRANET DARK-NET COMMUNICATIONS

(71) Applicant: Vectra Networks, Inc., San Jose, CA (US)

(72) Inventors: Nicolas Beauchesne, Miami Beach, FL (US); Sungwook Yoon, Palo Alto, CA (US)

(73) Assignee: Vectra Networks, Inc., San Jose, CA (US)

( * ) Notice: Subject to any disclaimer, the term of this patent is extended or adjusted under 35 U.S.C. 154(b) by 0 days.

(21) Appl. No.: 14/644,182

(22) Filed: Mar. 10, 2015

(65) Prior Publication Data
US 2015/0264078 A1    Sep. 17, 2015

Related U.S. Application Data

(60) Provisional application No. 61/951,500, filed on Mar. 11, 2014.

(51) Int. Cl.
*H04L 29/06* (2006.01)
*H04L 29/08* (2006.01)

(52) U.S. Cl.
CPC ...... *H04L 63/1441* (2013.01); *H04L 63/1408* (2013.01); *H04L 67/10* (2013.01)

(58) Field of Classification Search
CPC .................................................. H04L 63/1408
See application file for complete search history.

(56) References Cited

U.S. PATENT DOCUMENTS

| 7,159,149 | B2 | 1/2007 | Spiegel et al. | |
|---|---|---|---|---|
| 8,413,238 | B1* | 4/2013 | Sutton | H04L 63/1416 709/223 |
| 9,258,319 | B1* | 2/2016 | Rubin | G06F 21/554 |
| 2006/0026273 | A1* | 2/2006 | Comay | H04L 63/1416 709/223 |
| 2007/0083931 | A1* | 4/2007 | Spiegel | H04L 63/145 726/24 |

(Continued)

OTHER PUBLICATIONS

GT, Dark Spaces, 2007, http://www.govtech.com/security/DarkSpaces.html.*

(Continued)

*Primary Examiner* — Tae Kim
*Assistant Examiner* — Khang Do
(74) *Attorney, Agent, or Firm* — Vista IP Law Group, LLP

(57) ABSTRACT

A method and system for detecting network reconnaissance is disclosed wherein network traffic can be parsed into unidirectional flows that correspond to sessions. A learning module may categorize computing entities inside the network into assets and generate asset data to monitor the computing entities. If one or more computing entities address a flow to an address of a host that no longer exists, ghost asset data may be recorded and updated in the asset data. When a computing entity inside the network contacts an object in the dark-net, the computing entity may be recorded a potential mapper. When the computing entity tries to contact a number of objects in the dark-net, such that a computed threshold is exceeded, the computing entity is identified a malicious entity performing network reconnaissance.

20 Claims, 14 Drawing Sheets

(56) References Cited

U.S. PATENT DOCUMENTS

| | | | |
|---|---|---|---|
| 2008/0101234 A1* | 5/2008 | Nakil | H04L 63/1425 |
| | | | 370/235 |
| 2011/0055921 A1 | 3/2011 | Narayanaswamy et al. | |
| 2013/0133074 A1* | 5/2013 | Amoroso | H04L 12/2602 |
| | | | 726/25 |
| 2013/0311676 A1* | 11/2013 | Wilkinson | H04L 63/1433 |
| | | | 709/245 |
| 2014/0047547 A1* | 2/2014 | Mahadik | H04L 63/1433 |
| | | | 726/25 |
| 2014/0289840 A1* | 9/2014 | Jain | H04L 63/0245 |
| | | | 726/13 |

OTHER PUBLICATIONS

PCT International Search Report and Written Opinion for International Application No. PCT/US2015/019800, Applicant Vectra Networks, Inc., forms PCT/ISA/210, 220, and 237, dated Jun. 17, 2015 (7 pages).

PCT International Preliminary Report on Patentability for International Appln. No. PCT/US2015/019800, Applicant Vectra Networks, Inc., et al., dated Sep. 22, 2016 (6 pages).

* cited by examiner

DETECTING NETWORK RECONNAISSANCE BY TRACKING INTRANET DARK-NET COMMUNICATIONS

CROSS-REFERENCE TO RELATED APPLICATION(S)

The present application claims the benefit of U.S. Provisional Application Ser. No. 61/951,500, filed on Mar. 11, 2014, titled "DETECTING STEALTHY RECONNAISSANCE BY TRACKING AN INTRANET DARKNET", the content of the aforementioned application is hereby incorporated by reference in its entirety.

BACKGROUND

In the realm of computer security, one of the four major phases in the intrusion cycle is reconnaissance. Reconnaissance allows a malicious actor to gather intelligence about the configuration of a given network and be able to identify the next target and other operational information. For intrusions that have already been somewhat successful, the reconnaissance phase will likely occur from a host already infected inside the controlled perimeter of the network. Since the reconnaissance is performed from within the network, typical border/egress monitoring devices can play no role in detecting this phase of the attack. Often, the main goal of the reconnaissance phase is to create an inventory of hosts and services that are available inside the network.

In modern networks, passively listening to the traffic the infected host sees will only provide limited insight into the network. For this reason, most reconnaissance efforts tend to involve active techniques, where the infected host generates packets that trigger answers from other hosts in the network. This creates a situation where the attacker effectively tries to map the network by blindly poking into space hoping (and often failing) to encounter an object there, such as a computing entity (e.g. host, asset). Being able to identify hosts that are trying to construct a map of the network in this manner is a critical foundation of a good network defense. In most modern networks, these maps tend to be somewhat dynamic, making it difficult to identify hosts trying and failing to find something. Dynamic Host Configuration Protocol (DHCP) and other protocols allow devices to join the network and change their Internet Protocol (IP) address based on a scheme involving assignment from a circular queue of available IP addresses, thus facilitating the automatic use and basic configuration of devices inside the network.

Given the significant threat posed by attackers that infect a network and then attempt to spread the infection further inside the network, it would be of great value to an organization to be able to identify situations where an attacker performs this type of reconnaissance in its network. As explained, current approaches fall short because they are designed to defend or detect at the border of the network and are effectively blind towards malicious entities operating inside the network.

As is evident, there is a demand for improved approaches for defending against internal network reconnaissance.

SUMMARY

In some embodiments, a system for detecting network reconnaissance, including dark-net mapping behaviors, is disclosed. In some embodiments, network packets for a network, such as internal network, are first parsed or processed into flows of unidirectional communications between computing entities inside the network. Asset data may be generated that records which assets are known to exist inside the network. In some embodiments, a ghost asset may be recorded as asset data if a plurality of hosts try to connect to an address that is not assigned to an existing device, or belongs to an existing device that is temporarily disabled.

In some embodiments, potential mappers are identified by analyzing whether an initiating host has tried to contact objects/entities in the Dark-net (e.g. parts of a network with unassigned addresses). In some embodiments, if a potential mapper has tried to contact a number of dark-net objects, where the connection attempts exceed a threshold, the potential mapper is identified or labeled as a malicious entity that is performing network reconnaissance.

Other additional objects, features, and advantages of the invention are described in the detailed description, figures, and claims.

DETAILED DESCRIPTION

Embodiments of the present approach provide a system and method for detecting when an attacker performs reconnaissance in an organization's network.

In some embodiments, the list of internal IP addresses (e.g. IP addresses inside a network) that have not been recently assigned to a machine may be referred to as the "Internal dark-net" (to, at least, distinguish them from the global dark-net of Internet-accessible IP addresses that have not been assigned to any organization). In some embodiments, temporarily unused IP addresses, such as ghost assets, will not be placed on the Internal Dark-net list. As used herein the term "dark-net" may refer illustratively to an internal network address (e.g. MAC, IP, IP/port combination) that has not shown prior activity for some length of time. In some embodiments, to be considered part of the dark-net, the internal network addresses will have not shown any prior activity for all known history. In some embodiments, to be considered part of the dark-net, the internal network addresses will have not shown any prior activity for implementation specified periods of time (e.g. days, months, years). In some embodiments, the term "dark-net activity" may refer illustratively to a failed attempt to connect to a network address on the dark-net.

In some embodiments, reconnaissance behavior is detected by tracking an organization's internal dark-net and detecting attempts to connect to addresses on the list. Some embodiments may implement self-learning systems, approaches, or methods to handle dynamic changes in an organization's internal network without the need for human intervention. Therefore, some embodiments of the invention operate by detecting attempts to map out an internal network and tracking available assets in the internal network as well as "dark" addresses of the network. By tracking the assets, suspicious activity can be detected much earlier, as compared to conventional legacy approaches, and without false positive alarms. In some embodiments, each computing asset (e.g. "asset") may be a network server (e.g. file server, printer, phone, "host", "client") or a user-assigned computing device (e.g. desktop, laptop, mobile phone, tablet).

Figure 1A:
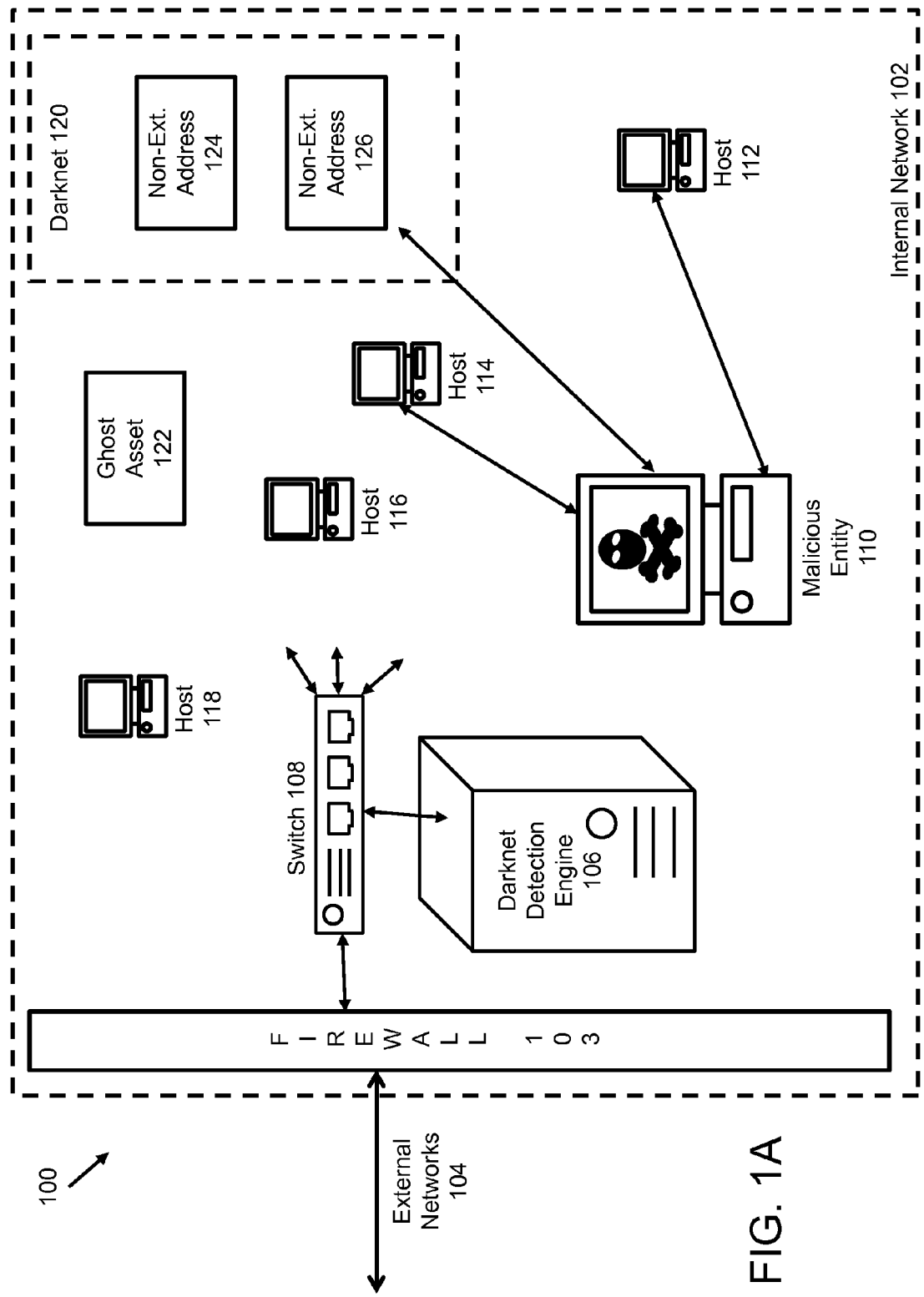
FIG. 1A-B illustrate approaches for implementing a dark-net detection engine in an internal network environment, as according to some embodiments.

FIG. 1A illustrates an environment 100 for implementing a dark-net detection engine in an internal network 102, as according to some embodiments. There, the internal network environment comprises one or more hosts (e.g. assets, clients, computing entities), such as host entities 112, 114, 116, and 118, that may communicate with one another through one or more network devices, such as a network switch 108. The internal network 102 may communicate with external networks 104 through one or more network border devices, such as a firewall 103. Thus, as illustrated in this example, the hosts are isolated in the internal network 102. As explained, dark-net 120 may comprise addresses that do not exist (e.g. non-existent addresses 124, 126).

However, in some embodiments, dark-net may exclude addresses for assets that once existed (e.g. a printer) but have since been removed. For example, if a printer has been removed, one or more hosts in the internal network may not have been notified of its removal. Thus, the hosts may still try to attempt to contact the printer at its old address. These once existing assets may be referred to as ghost assets (e.g. ghost asset 122). While the addresses may be assigned to effectively non-existing assets (e.g. temporarily down, recently removed), they may be nonetheless categorized as not dark-net related.

In this example, a malicious entity 110 (e.g. an infected host computer) has come under the control of a malicious user (e.g. human, malware) to carry out malicious tasks. To carry out an attack, malicious entities may try to first map out the network environment they are targeting to better understand the layout, potentially find weak points to attack, or look for confidential data to steal. This mapping or reconnaissance behavior is typically performed by pinging addresses (e.g. scanning) inside the network and listening for responses. If there is a response, the malicious entity determines that it has contacted an existing device. In this way, the malicious entity 110 can generate a map of the internal network 102 that it may later use to attack the network.

For example, as illustrated, malicious entity 110 may first ping the address belonging to host 114. If host 114 responds malicious entity may add host 114 to its map. Similarly, malicious host may ping host 112; if a response is received, malicious entity 110 may further add host 112 to the network map. Because malicious entity 110 is unfamiliar with the internal network it is trying to map, it commonly pings addresses that are not assigned to an existing asset. For example, after pinging host 114 and 112, malicious entity 110 may ping one or more addresses that do not exist (in as much they are not assigned to existing assets), such as non-existent address 124 or non-existent address 126. Since no assets have been assigned the addresses, no response will be sent back to malicious entity 110 in response to the pings. As such, the malicious entity may then record that no response was received and add the address to his network map as "non-assigned" or non-existent.

As mentioned, at the mapping (e.g. reconnaissance) stage, malicious entities are typically already inside the network. If they were outside the network and trying to map an internal network their attempts would be stymied by network border defenses and schemes, such as a NAT or a firewall. However, if a malicious entity is already inside the network, firewalls and other border-centric network defenses are useless against internal reconnaissance behaviors.

The dark-net detection engine 106 enables dark-net reconnaissance behavior to be detected and reported. In some embodiments, as illustrated, the dark-net detection engine 106 may tap the network switch 108 to passively analyze the internal network traffic in a way that does not harm or slow down the network (e.g. by creating a copy of the network traffic for analysis). In some embodiments, the dark-net detection engine is an external module that is coupled to the switch 108. While in some embodiments, the dark-net detection engine may be directly integrated into network components, such as the switch 108 or the firewall 103. While still, in some embodiments the dark-net detection engine may be integrated into one or more hosts (e.g. 118) in a distributed fashion (e.g. each host may have its own set instructions, the hosts collectively agree to follow or adhere to the instruction to collect information and report information to one another or to the database to collectively work as a dark-net detection engine). Still in some embodiments, the dark-net detection engine may be integrated into a single host that performs the engine's actions for the internal network 102.

Figure 1B:
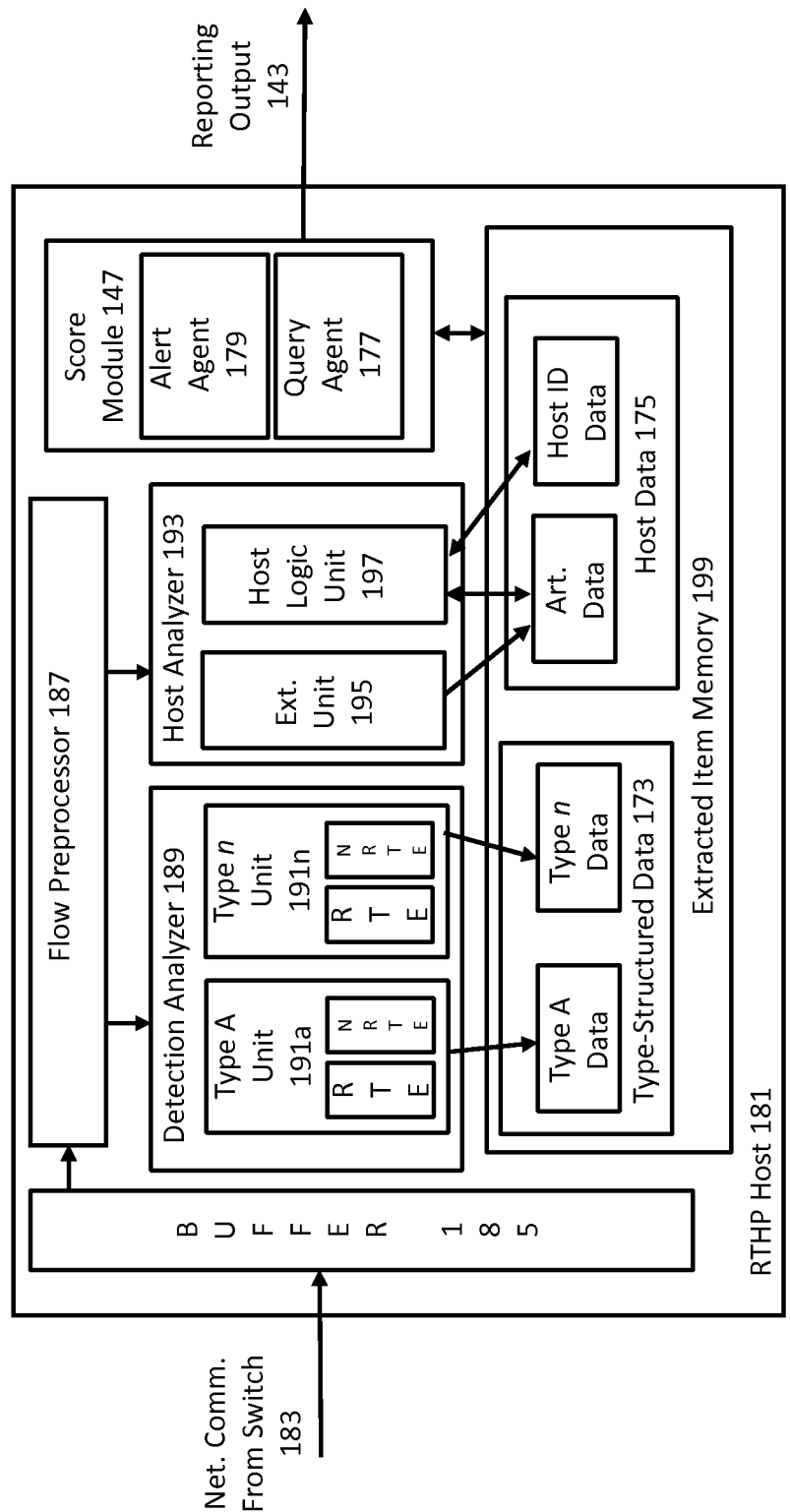

FIG. 1B illustrates an example system in which the approaches disclosed may be implemented. FIG. 1B shows internal aspects of a real-time historical perspective engine (RTHP) 181. At 183, network communications from a switch may be received by RTHP 181 and loaded into a buffer (e.g. rolling buffer) memory structure 185. A flow preprocessor 187 can parse the network traffic using one or more parsing units (not depicted), each of which may be tuned to parse different types of network traffic (e.g. HTTP, TCP). In some embodiments, the flow preprocessor 187 generates session datasets that correspond to communications between two hosts (e.g. between two hosts inside a network or between an external host/entity and an internal host).

The session datasets may be analyzed by a detection analyzer 189, which detects different types of threats or analysis data, and a host analyzer 193, which analyzes the hosts which generated the network traffic. In some embodiments, the detection analyzer 189 and host analyzer 193 may extract one or more data items and store them in an extracted item memory 199.

In particular, the session datasets may be analyzed by a detection analyzer unit 189, which may comprise one or more detection units 191a-191n. In some embodiments, the detection units may contain a real time analysis engine ("RTE") which can identify threats without collecting past data (e.g. accumulating state) and a non-real-time analysis engine ("NRTE"), which generally accumulates data about network events that appear benign, but accumulate to significant threat levels (e.g. DDoS attacks).

In some embodiments, the detection units are customized to analyze the session datasets and extract type-specific data that corresponds to various network threats, attacks, or analysis parameters. For example, detection unit Type A 191A may be designed for detecting relay communication attacks; for every type of relay communication detected, detection unit Type A 191 may store the detection in "Type A" structured data. As a further example, detection unit Type n 191n may be designed to detect bot activity, such that every time a computer or host in the network performs bot-related activities, detection unit Type n may store detection-related data in "Type n" structured data. In some embodiments, the detection data per unit may be stored in a type-structured data 173 portion of memory, which may be partitioned from extracted item memory 199.

In some embodiments, the host analyzer 193 comprises an extraction unit 195 and a host logic unit 197. The extraction unit 195 is designed to extract artifacts or identification data (e.g. MAC address, IP address), which may be used to identify a host, and store the extracted data in an artifact data store ("Art. Data") in host data 175. The host logic unit may analyze the extracted artifact data and generate host ID data (e.g. durable host IDs).

In some embodiments, a score module 147 may be implemented to analyze the extracted item memory 199, score the detections in the type-structured data 173, and correlate the detections with host ID data. In some embodiments, the score module 147 can run checks on the type-structured data to determine if any thresholds have been exceeded. In some embodiments, the score module may edit or update the host ID data (e.g. in host data 175) with new detection information. For instance, the score module may correlate newly detected bit-coin mining activity to an existing host ID and update the host ID with further information regarding the recent bit-coin activity. In some embodiments, the score module 147 further comprises an alert agent 179 which can generate alert data if a network attack threshold is exceeded. In some embodiments, the score module 147 comprises a query agent 177 which can retrieve data from the extracted item memory 199 in response to network security administrators or other network security devices. In some embodiments, the score module may generate the alert data or query responses as reporting output 143.

Further details of an example system are described in U.S. patent application Ser. No. 14/643,931, entitled "A system and method for detecting intrusions through real-time processing of traffic with extensive historical perspective", filed on even date herewith, which is hereby incorporated by reference in its entirety.

Figure 2:
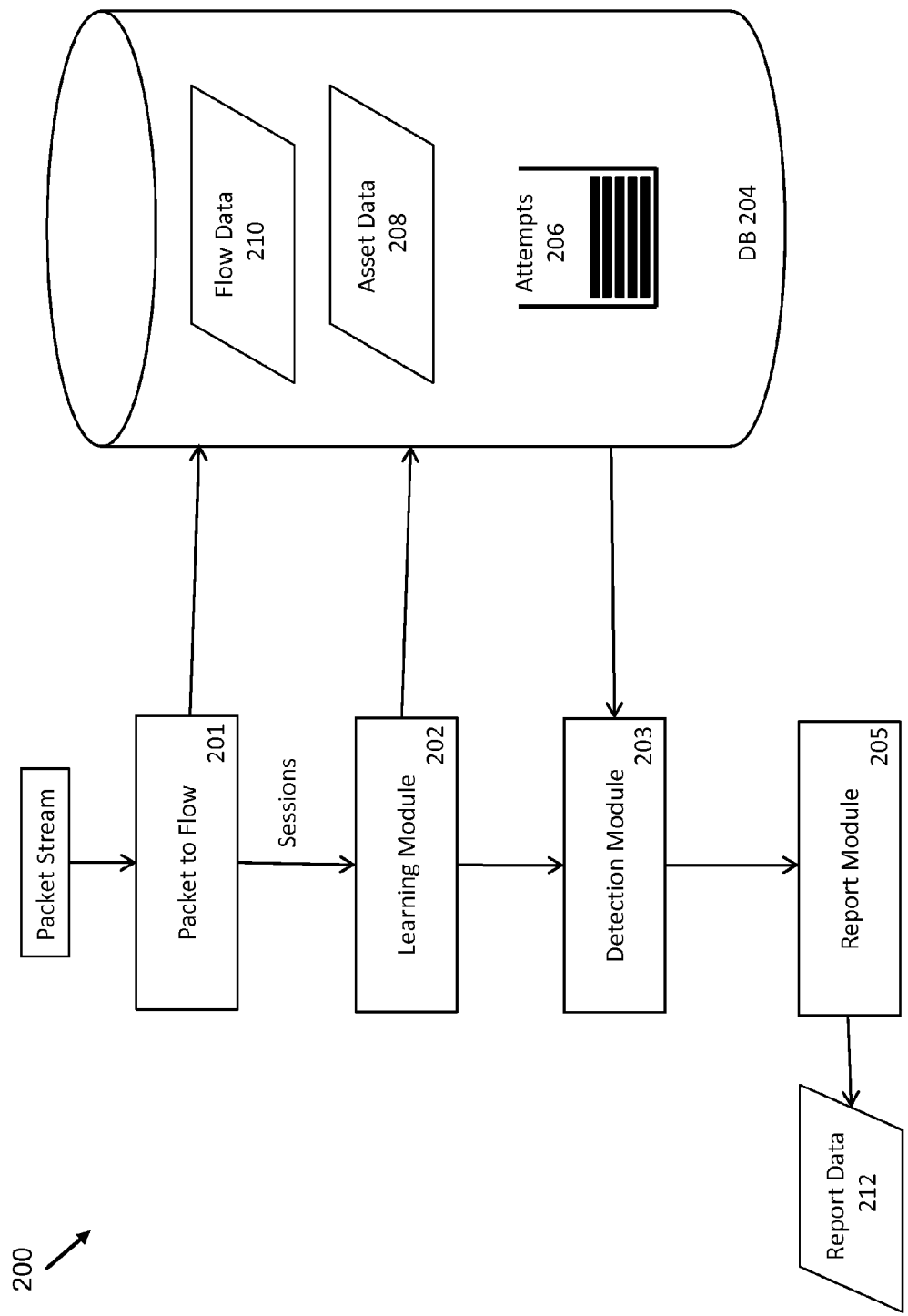
FIG. 2 shows a flow and data structures for an approach for dark-net detection, as according to some embodiments.

FIG. 2 shows flow and data structures 200 for an approach for dark-net detection, as according to some embodiments. A flow engine 201 may be provided to observe packets sent on one or more mirror or TAP (Test Access Point) ports on a network (e.g. internal network 102, FIG. 1). In some embodiments, the packets may be processed into session datasets and stored as flow data 210 in a storage device, such as database 204. At 202, a learning module may be used to learn about available computing assets that exhibit network communication behavior and generate asset data 208. At 203, a detection module may be employed to generate or collect attempt data 206 and detect the presence of reconnaissance behavior likely associated with an infected host. In some embodiments a reporting module at 205 may generate report data 212 when it is determined that one or more hosts exceed an attempt data threshold (e.g. which may correspond to dark-net reconnaissance behavior or scanning).

In some embodiments, the flow engine 201 may preprocess information for the dark-net detection engine 106 by receiving packets from the network (e.g. packets received from the network switch) and constructing one or more bi- or uni-directional flow datasets 210 at OSI (Open System Interconnection) layer 3. In IP networks, layer 3 flows typically carry TCP (Transmission Control Protocol) or UDP (User Datagram Protocol) sessions. In some embodiments, the learning module at 202 of the dark-net detection engine may use the flow data 210, including packet source data, to learn network behaviors and monitor the existence of assets available on the organization's internal network. Given an IP address, if the learning module observes successful connections from a source asset, the source asset and the destination IP are registered with the dark-net detection engine as assets given that both are available in the organization's network. In some embodiments, the registration process includes updating structured data, such as asset data 208, once assets are detected and/or identified.

In cases where the network protocol is TCP and one or more communication targets correctly respond, the one or more targets may be added to the asset list (e.g. asset data 208). If multiple internal assets attempt to reach a target more than a specified number of times—"Failed Connections" (FC) attempts, but the target does not respond, the dark-net detection engine may treat the target as an existing asset which is temporarily unavailable (e.g. ghost asset 122) even though the dark-net detector engine has technically not seen the missing asset sending a packet on the network. In some embodiments, the failed connection attempts may be monitored by generating and/or updating the attempt data 206 in a database 204. In some embodiments, the database 204 is internal to the dark-net detection engine, while in some embodiments, the database may be an external database coupled to the dark-net detection engine.

At 203, the detection module may use the data generated by the learning module to assist in the detection of dark-net access behavior. In some embodiments, when an internal asset attempts to connect to an IP address that has yet to be seen (e.g. data not in the asset data 208), the detector module may not immediately report this as an attempt to connect to a dark IP as a single attempt does not necessarily constitute reconnaissance (it may simply be a mistyped address by an administrator or an end-user). Instead, the dark-net detector engine may wait until a sufficient number of attempts to reach dark IPs (e.g. 122, 124, 126) have been made by the same asset within a window of time before reporting the corresponding Dark-net behavior to IT security staff, or generating alarms, alarm data, and/or updating a alarm history database.

Figure 3:
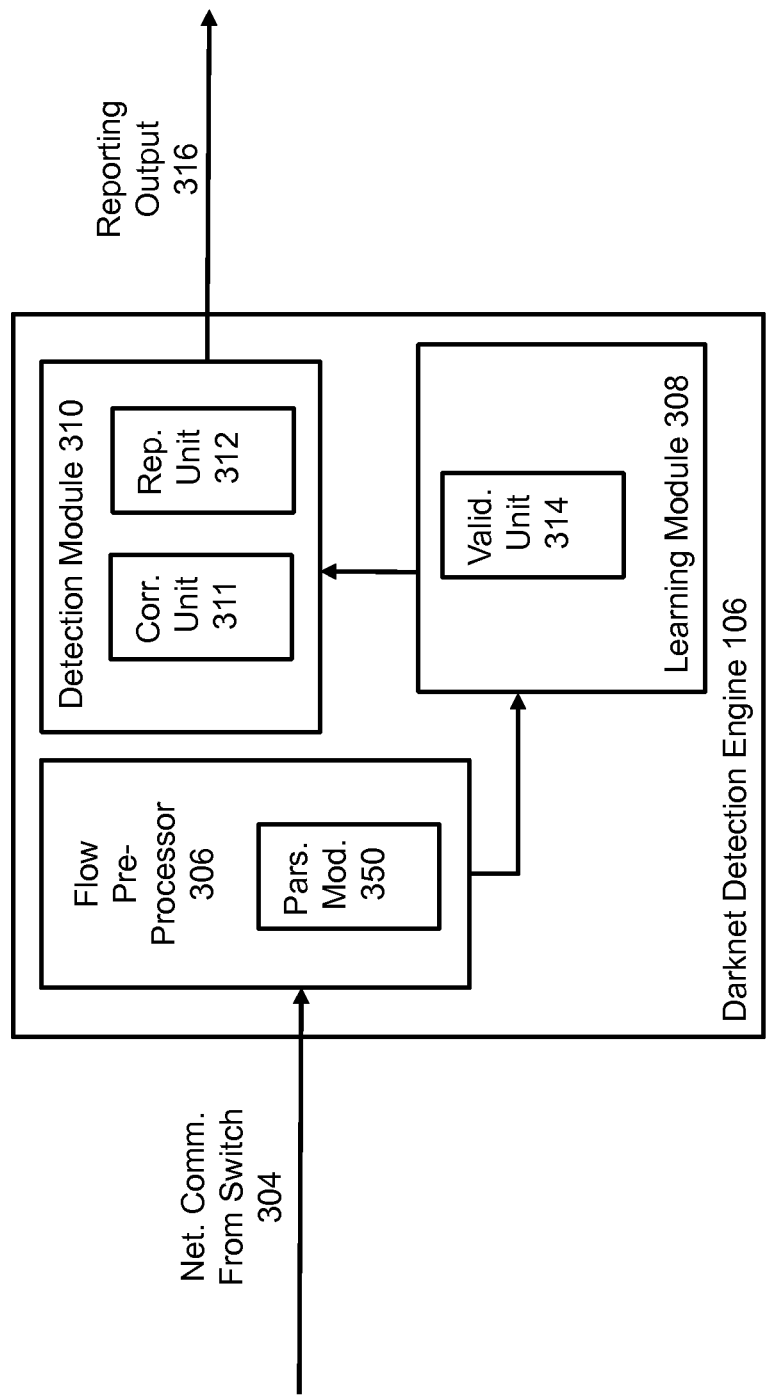
FIG. 3 illustrates internal aspects of a dark-net detection engine, as according to some embodiments.

FIG. 3 illustrates internal aspects of a dark-net detection engine 106, as according to some embodiments. At 304, data packets from the network (e.g. tapped from the network switch 108) may be received by the Dark-net detection engine 106. At 306, the packets may first be processed by a flow pre-processor engine 306. The pre-processor may receive the packets from a network, examine information such as source and destination addresses and combine or correlate the packets into unidirectional flows (e.g. generate flow data 210) using a parsing module 350 that works with various network protocols and layers.

In some embodiments, after the network traffic has been parsed into flows by the flow pre-processor 306, the network traffic may be analyzed by the learning module 308. The learning module 308 may create asset data using a validation module or unit that maps out known assets (e.g. hosts, 112, 114, 116, 118) as well as objects such as ghost assets 122. After the network is mapped (e.g. asset data 208 is generated), the network may be monitored for dark-net reconnaissance.

The detection module may monitor the internal network using a correlation unit 311 that monitors past dark-net activity (explained in further detail below) and a reporting unit 312, which determines whether or not to report a host as a malicious entity that is attempting to map the network for malicious purposes. If the detection module 310 determines that malicious mapping behavior is occurring, it may output report data at 316 for IT security to examine and/or respond to the attack.

Figure 4:
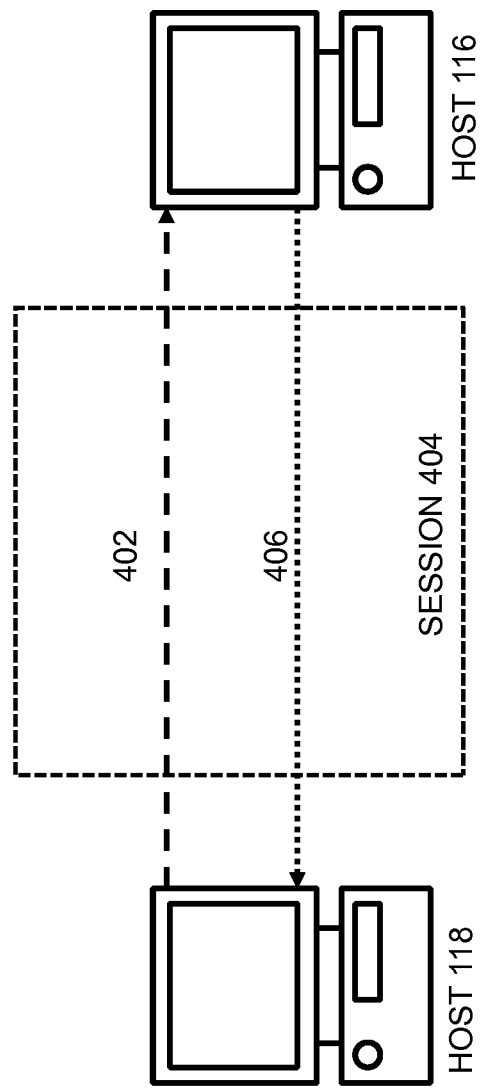
FIG. 4 illustrates a session comprised of unidirectional flows between two computing entities, as according to some embodiments.

FIG. 4 illustrates a session comprised of unidirectional flows between two computing entities, as according to some embodiments. In this example, host 118 is communicating with host 116. First, host 118 generates a first communication flow 402 (e.g. request). Second, host 116 generates a second communication flow 406 (e.g. response). As explained, by examining packet contents, such as source and destination addresses, flow pre-processor 306 may combine matching flows into a session 404. However in some cases, a request 402 is sent, but there is no reply (e.g. response 406 does not occur). This may be because the host 118 addressed its communications to a non-existent target. Nonetheless, this communication may still be categorized a session by the flow pre-processor 306. In some embodiments, a session may consist of as little as a single packet. After identifying and categorizing one or more flows into sessions, the flow pre-processor may store the session data (e.g. session datasets), unidirectional flow data, and other data, such as session identifiers, as flow data 210.

Figure 5A:
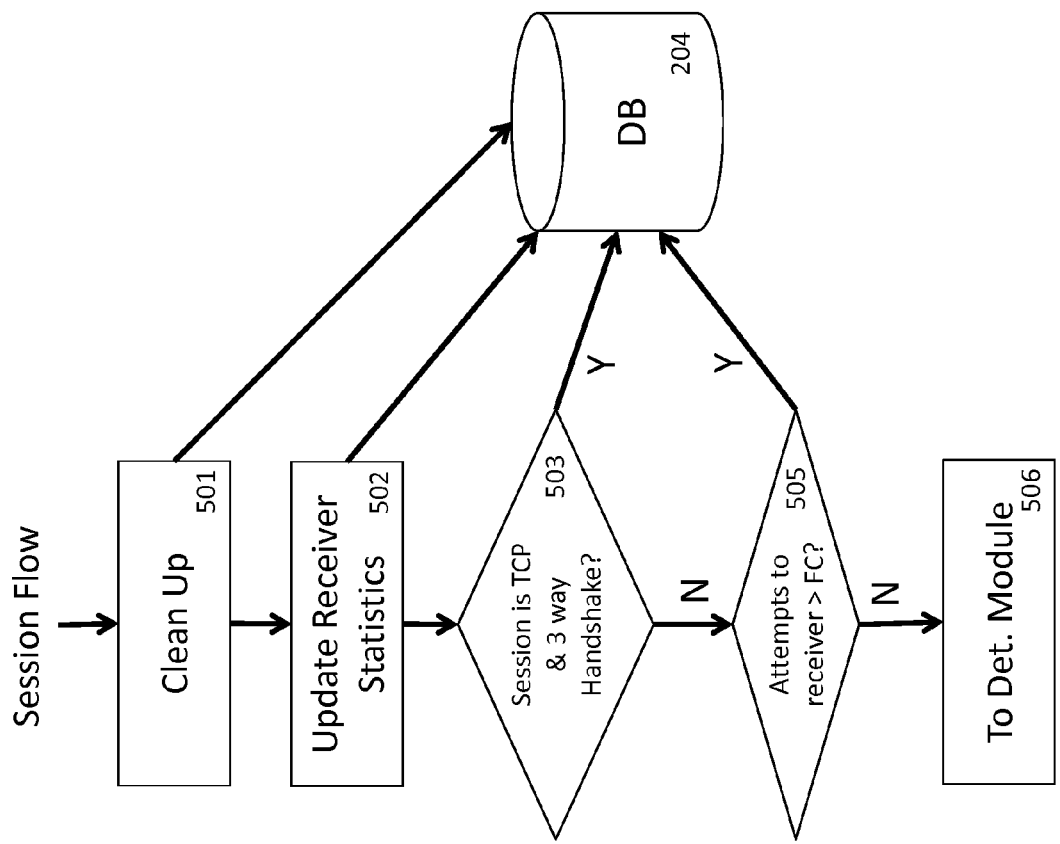
FIG. 5A shows a flow and data structures for an approach for dark-net detection using a learning module, as according to some embodiments.

FIG. 5A shows flow and data structures for an approach for dark-net detection using a learning module, as according to some embodiments. At 501, the learning module may periodically clean up the asset data 208. In a clean up operation, the learning module looks at the latest observed times (e.g. last time accessed) of the assets and purges them (e.g. removes them from asset data 208) if the latest observation has been more than a pre-specified purge time (e.g. 14 days, 1 month, 1 year) in the past. In some embodiments, purge time refers illustratively to the length of a period of inactivity after which the system (e.g. 310, 106) erases an observed asset record from the asset data 208. If the inactive period is more than the purge time, the asset may have been been retired or removed from the internal network 102. The remaining assets may be maintained in the database 204 that holds asset data 208.

Figure 5B:
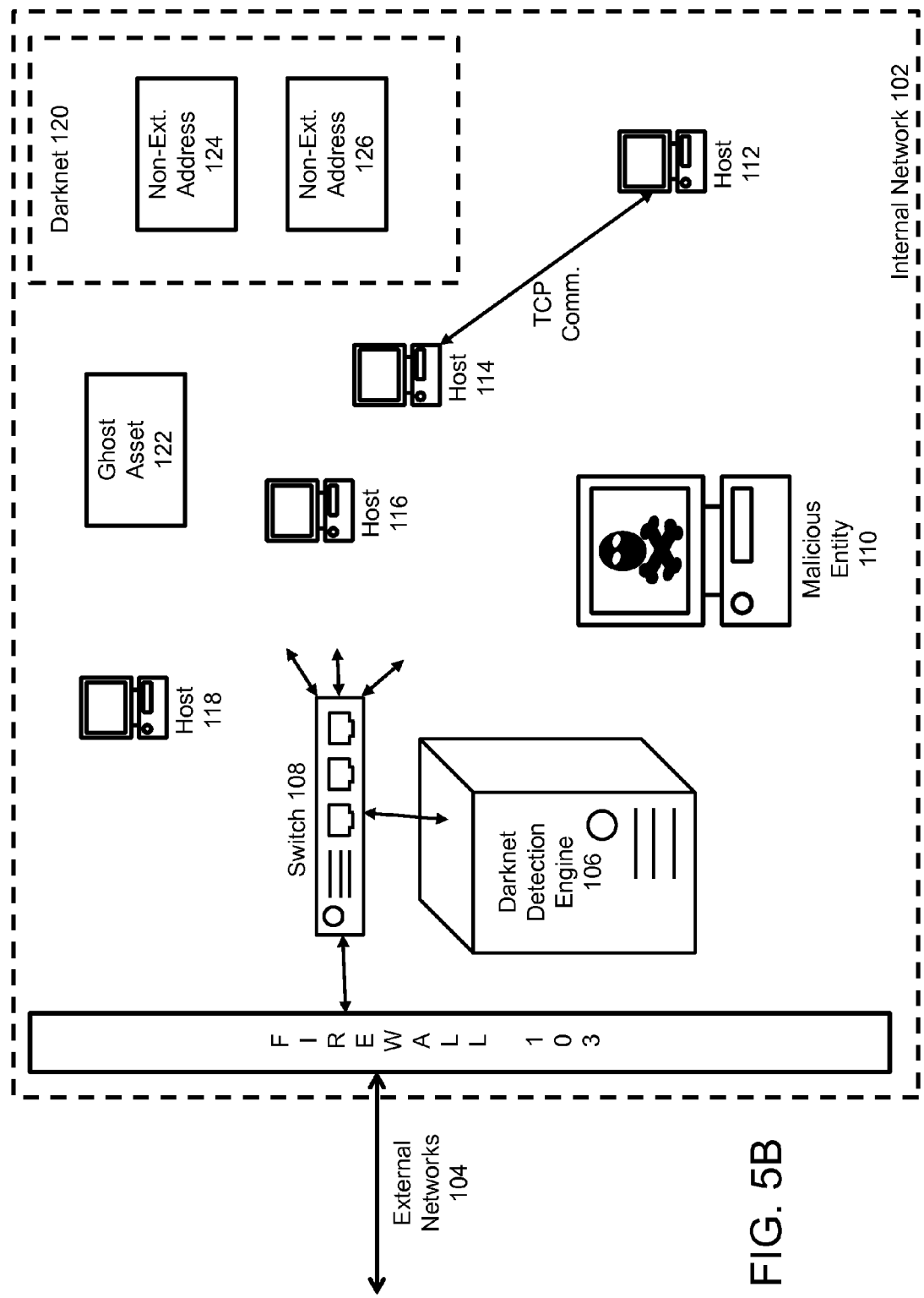
FIG. 5B illustrates two computing entities performing a reciprocal communication in an internal network, as according to some embodiments.

At 502, the learning module may record how many times a target (e.g. host 118, ghost asset 122) has been contacted and update attempt data 206. At 202, the learning module may determine whether a session has resulted in a successful reciprocal communication, per protocol specifications. For instance, referring to FIG. 5B, host 114 is attempting to connect to host 112. Per TCP, host 114 may first send a SYN to host 112; host 112 may respond with a SYN/ACK; after which host 114 may send back the final ACK, thus completing a three-way TCP handshake. The Dark-net engine is able to monitor this progression by analyzing the network traffic (e.g. packets send/received) between the hosts. Once a successful handshake occurs, the validation unit or module 314 may update both host 112 and host 114 as assets in asset data 208.

If a successful reciprocal communication has not occurred (e.g. if the protocol was not TCP but instead UDP, for instance, or if it was TCP but the 3-way handshake did not conclude successfully, e.g. SYN was sent, but no SYN/ACK received in response), the learning module may check whether more than a specified number of internal assets have attempted to contact the target at 505.

If several different assets have unsuccessfully attempted to connect to the target, the target is treated as a valid internal asset (e.g. ghost asset 122) even though it has technically not responded to any of the requests. In some embodiments, after a ghost asset is recorded, further attempts to connect to it are not treated as monitored or acted upon. As mentioned, if many different internal assets unsuccessfully attempt to access the same target address, it is highly likely that the target was actually an available asset at some point in the past and that the attempts to connect to it are not part of a reconnaissance attempt. For instance, the asset may just not be available due to temporary service disruption or may have been moved to different IP address due to a reorganization of the network.

Figure 5C:
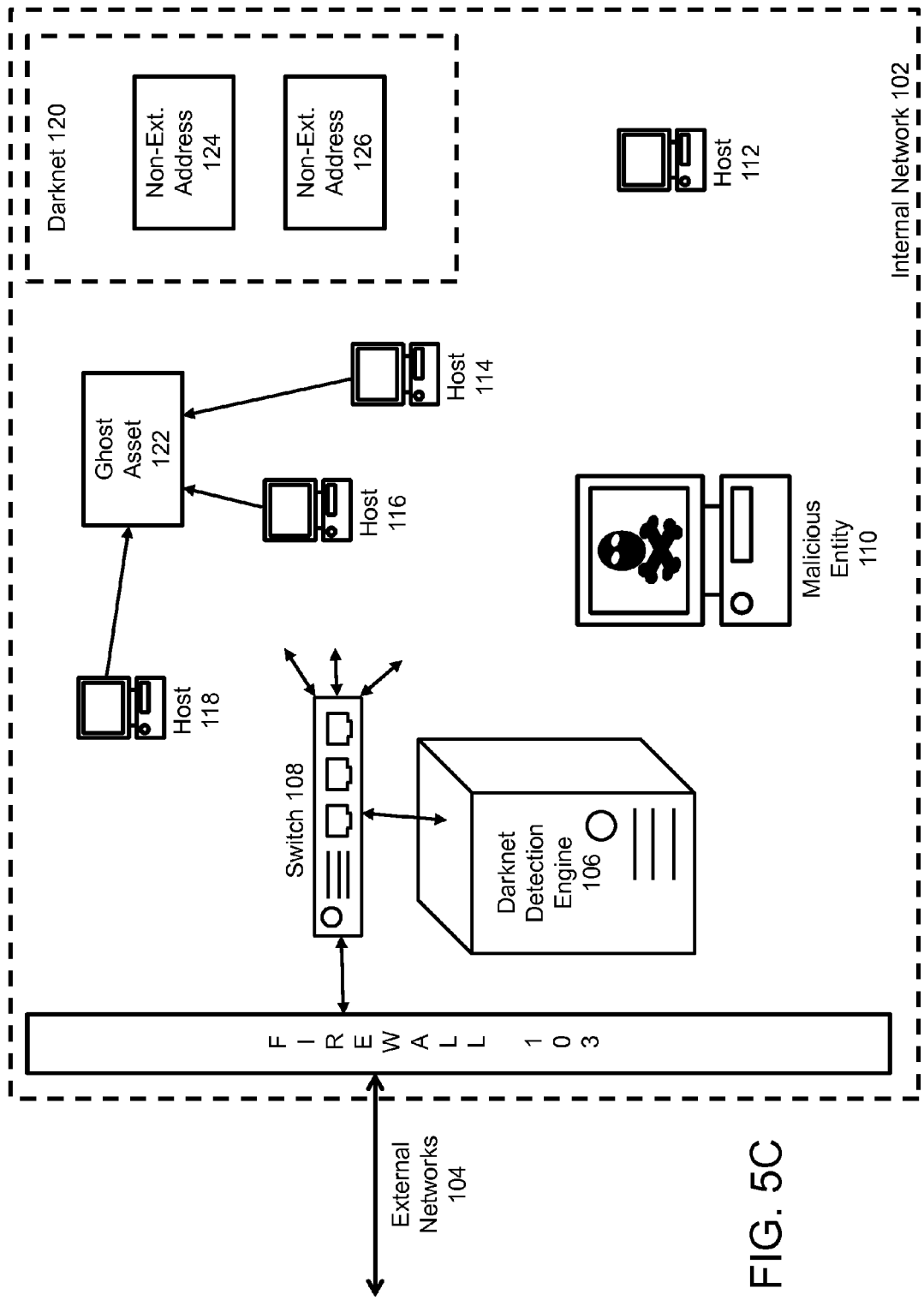
FIG. 5C illustrates three example hosts attempting to contact an asset that no longer exists, as according to some embodiments.

FIG. 5C illustrates an example of the failed connection registration process. There, a once existing asset such as a network printer is removed from the network, however the printer's address is still stored in host 118, host 116, and host 114 as valid. The three hosts attempt to connect to the printer at the old address and fail. Thus, at 503 the result is "no". That is, host 118 tried to connect to the printer and failed, as did hosts 116 and 114.

At 505 (FIG. 5A), the learning module may then determine whether more than a specified number of failed attempts have occurred for that address. A failed connection attempt threshold may be previously set per network, such that if more than the specified number of failed attempts occurs the address is associated and registered as ghost asset, as described in further detail below. For instance, if the failed connection attempt threshold is 2, and host 118, 116, and 114 attempt to connect to a missing asset, then at 505 (FIG. 5A), the learning module may generate a ghost asset 122 to associate with the address, and store the ghost asset and address data as asset data 208 in database 204.

Once the tracking, monitoring, and updating tasks have been completed by the learning module, the process may be handed over to the detection module at 506, as according to some embodiments. In some embodiments, the operation on this flow ends if the attempts to the target are bigger than the failed connection threshold. In some embodiments, the operation continues only if the attempts to the target are less than failed connection. The failed connection threshold may be a data item held in stored in database 204 that can be customized by network administrators to optimize the dark-net detection engine per different network environments. For instance, if the failed connection threshold is 10 (e.g. 10 assets/hosts tried to connect the same address), ghost assets may be efficiently registered in an internal network that consists of hundreds of host computers. However, a threshold of 10 may be too large if the internal network comprises only a 20 hosts. Therefore, in an example network of only 20 hosts, the failed connection attempt threshold may be set lower (e.g. 3) so that the dark-net detection engine still registers ghost assets in the relatively small network.

Figure 6A:
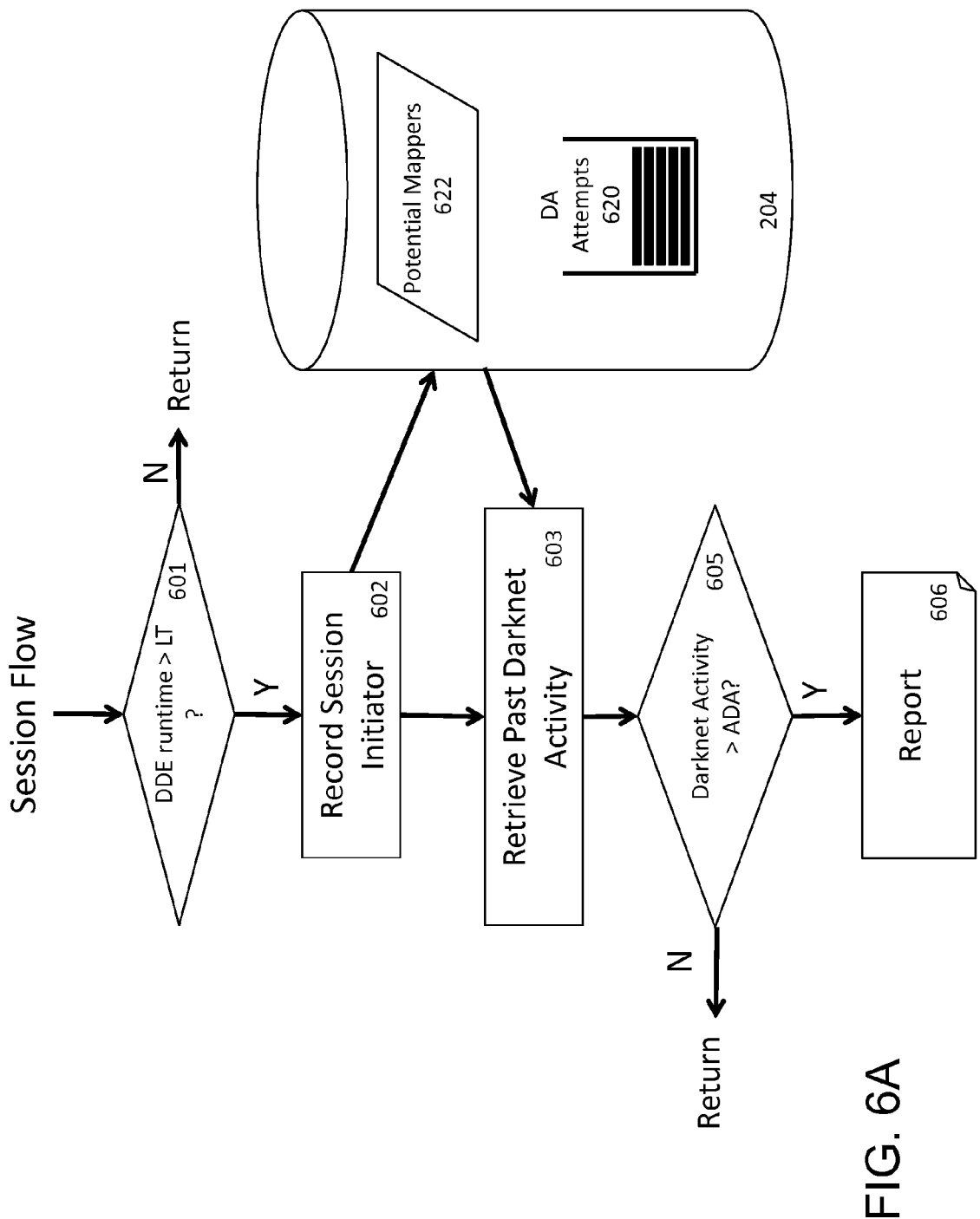
FIG. 6A shows a flow and data structures for an approach for dark-net detection using a detection module, as according to some embodiments.

FIG. 6A shows a flow and data structures for an approach for dark-net detection using a detection module, as according to some embodiments. At 601, the detection module checks if the dark-net detector engine (DDE) has been operating for more than a specified learning time (LT). The term "learning time" may refer illustratively to a dark-net detector engine waiting-period for observation to decide whether an internal asset is "dark" or "light" or gather further network information. During this time, the detector module 310 allows the learning module 308 to learn the network and generate asset data 208. In some embodiments, during this time the detector module typically does not report detections of dark-net behavior. If the learning time period has not been reached, the detection module in the dark-net detector may not be activated, as according to some embodiments. In this way, during the learning time period, the dark-net detector learns the light and dark parts of the organization's internal network 102.

The detector module may then use the asset data 208 and the flow data 210 (both of which, in some embodiments, may be continuously updated) to generate dark-net connection attempt data 620. At 602, session initiating entities may be recorded or stored. Because the asset data 208 is a data collection of the known assets (e.g. 112-118), as well as all innocuous ghost assets (e.g. 122), the detection can generate dark-net attempt data 620 by recording which entity initiated a flow and checking whether the flow (e.g. ping) is addressed to a known asset or ghost asset. If the flow is not addressed to a known or ghost asset, then the flow may be considered dark-net activity. At this stage, the dark-net accessor (e.g. the host entity that addressed a flow to a non-existing address) is tracked and data describing the entity and flow may be updated in the database as potential mappers 622. However, in some embodiments, the detected potential mapper is not yet reported. This is at least because the flow addressed to the non-existent address in dark-net may have been generated by mistake.

In addition to tracking potential mappers, the detector module may also retrieve dark-net activity data specific to one or more potential mappers for some interval of time (e.g. dark-net Interval). As the potential mappers are tracked using the potential mapper data 622 and the dark-net attempts are tracked using the dark-net attempt data 620, the detection module can use relational database techniques to determine how many attempts a potential mapper has made to access Dark-net objects (e.g. non-existent addresses 124, 122).

In some embodiments, an Allowed dark-net Activity (ADA) threshold may be set on an per asset, per asset-type, or per network basis. The ADA threshold specifies the number of allowed dark-net attempts a potential mapper can make before the potential mapper is categorized as a malicious entity (e.g. malicious entity 110) that is performing reconnaissance on the network.

Figure 6B:
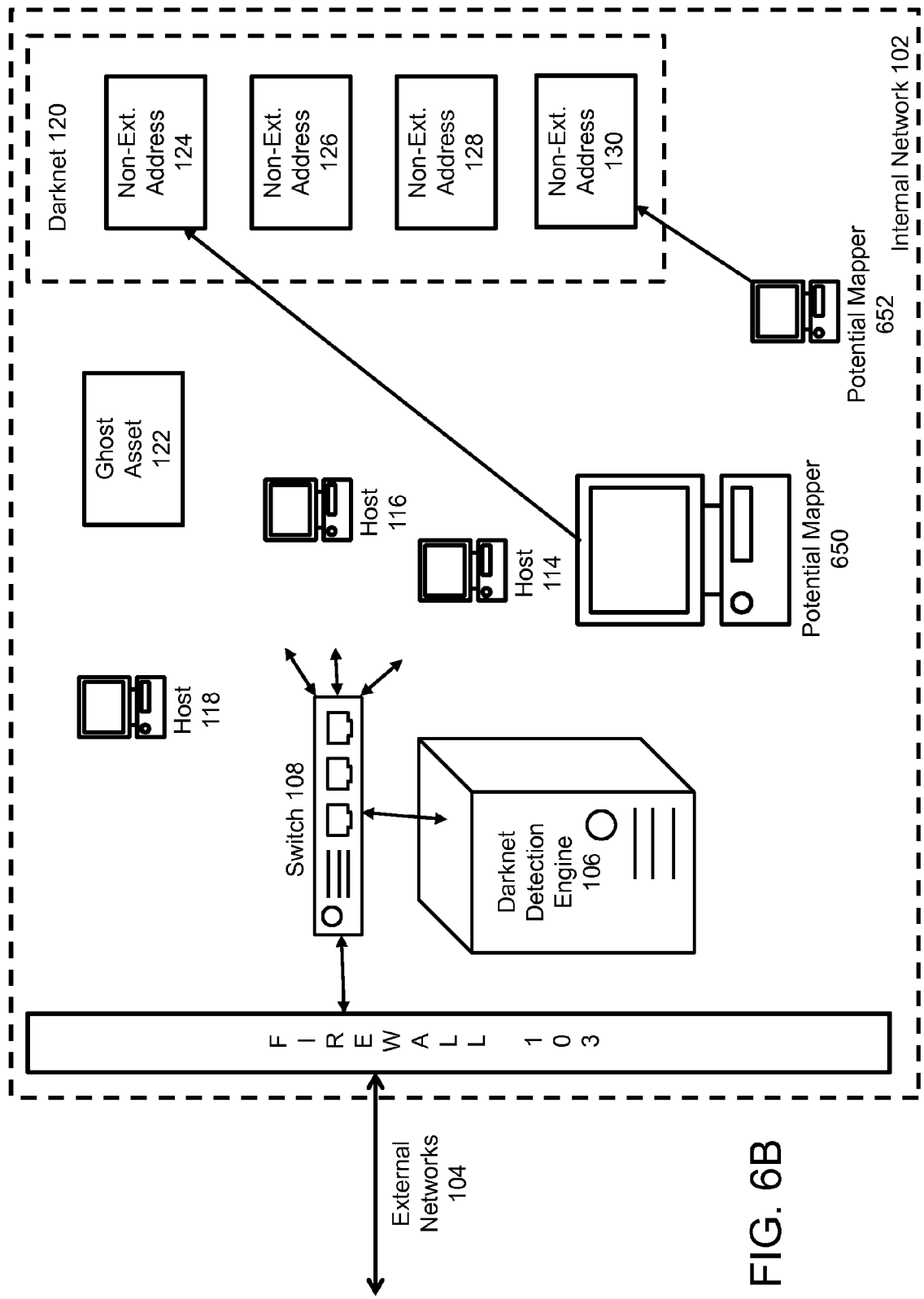
FIG. 6B illustrates two computing entities in the internal network attempting to connect to addresses for assets that do not exist, as according to some embodiments.
Figure 6C:
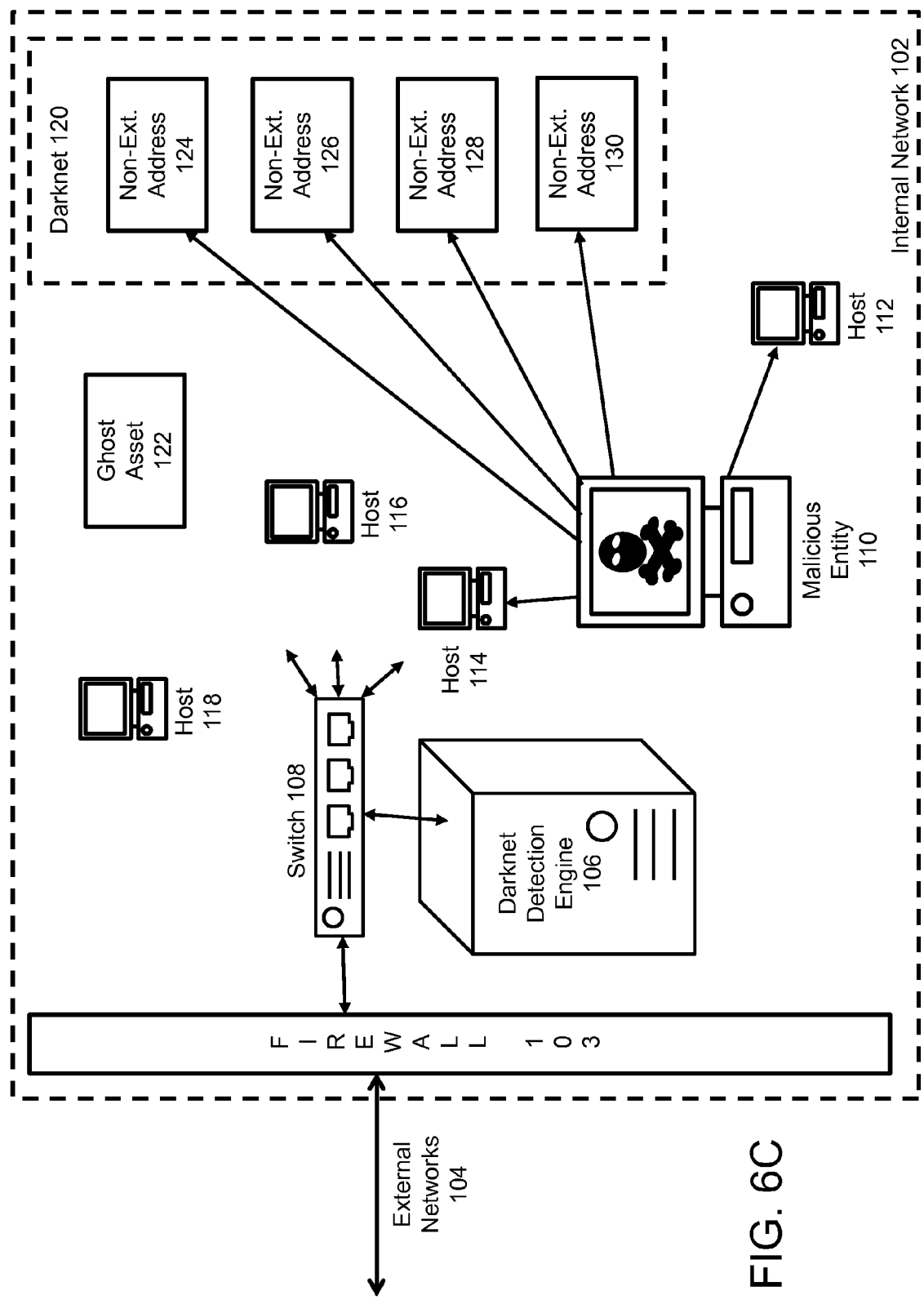
FIG. 6C illustrates a computing entity in an internal network contacting known and Dark-net assets, as according to some embodiments.

FIGS. 6B and 6C illustrate an example process of the detection and reporting stages. In FIG. 6B two entities inside the internal network 102 have tried to contact dark-net objects. In particular, potential mapper 650 has attempted to connect to non-existent address 124 and potential mapper 652 has attempted to contact non-existent address 130. As mentioned, one approach that the dark-net detection engine can deduce that computing entities are trying to contact dark-net objects is by checking information in packets sent to determine whether the destination address corresponds to a known asset in asset data 208. If the destination address does not match an address that corresponds to an asset in the asset data 208 then the dark-net detection engine may flag or identify the dark-net accessors as potential mappers.

Another approach for detecting attempts to contact dark-net objects includes maintaining a list of known addresses that are not in use (e.g. a dark-net list); if an entity tries to contact any of the addresses that are known to be not assigned or not in use, then the initiating entity may be flagged as a potential mapper.

Applied to the example illustrated in FIG. 6B, potential mapper 650 has contacted a dark-net object, at least determined because non-existent address 124 does not correspond to an asset in asset data 208; similarly, potential mapper 652 is mapped as a potential mapper for the same reason. At this point, at 602 (FIG. 6A) potential mapper data 622 may be updated to include potential mappers 650 and 652.

As explained, according to some embodiments, the potential mappers are not yet reported (as the attempt to contact a dark-net object may have been made by mistake). Instead, at 603 past dark-net activity data (e.g. dark-net Attempt data 620) may be retrieved from the database 204. At 605, the detector module may use the ADA threshold data item to make a comparison: does the dark-net activity (e.g. the number of attempts to contact dark-net objects) corresponding to a potential mapper exceed the ADA threshold? If so, at 606 the detector module can report the potential mapper as a malicious entity.

FIG. 6C shows an example where a potential mapper exceeds an ADA threshold. In contrast to FIG. 6B, which shows two isolated incidents of dark-net activity, the malicious entity 110 has made numerous attempts to contact dark-net objects. As illustrated, malicious entity has penetrated the internal network defenses (e.g. firewall 103) and has has begun to map the internal network in a reconnaissance effort. First, for example, the malicious entity may contact host 114 and host 112. Both of these assets are known in that they have corresponding addresses in asset data 208. As such, the malicious entity's attempts to contact the hosts may not yet trigger malicious reconnaissance behavior alerts.

However, in addition to contacting known assets, the malicious entity also blindly scans unknown addresses (in an effort to figure out the internal network landscape), thereby pinging non-existent address 124, 126, 128, and 130. Referring to FIG. 6A, the first attempt would register the malicious entity as a potential mapper in potential mapper data 622. The following three attempts bring the total attempt data to four (which may be monitored by DA attempt data 620). If the ADA threshold is 3 (for example), then malicious entity's four attempts would trigger the detector module to label the malicious entity as such, and report it at 606.

Figure 7:
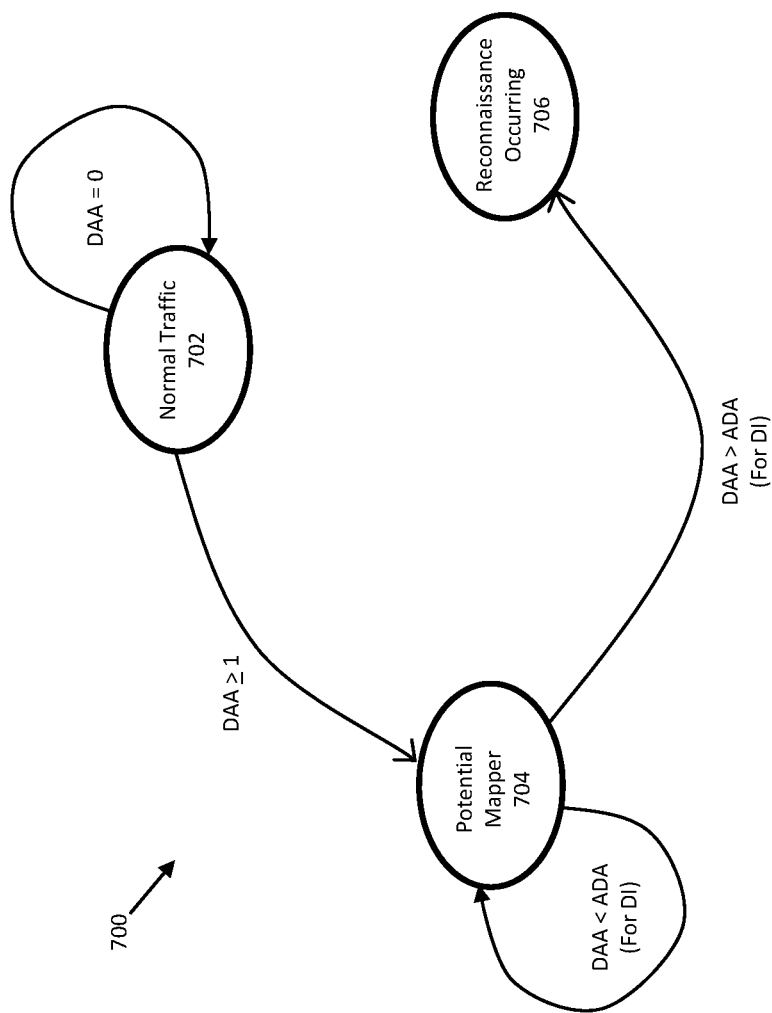
FIG. 7 illustrates a state machine for an approach for how the detection module may implement aspects of the Allowed dark-net Activity (ADA) threshold operation, as according to some embodiments.

In some embodiments each time dark-net activity is detected, a determination is made whether the initiated entity (e.g. dark-net accessor) has surpassed the threshold set by the ADA in the last dark-net interval. FIG. 7 illustrates this mechanism as a state machine 700. There, for example, assume the dark-net interval is 30 minutes (DI=30 minutes) and the ADA is 3 or more. At the 702 state, normal traffic is occurring; that is, no dark-net connection attempts (DAA) have been made. As long as no dark-net connection attempts are made, the machine stays on the normal traffic state (e.g. DAA=0, loop to state 702).

Once malicious entity 110 (FIG. 6C) contacts non-existent addresses 124 (see FIG. 6C), the detection module registers the dark-net connection attempt using the above methods. As such, at least one dark-net connection attempt as been made (e.g. DAA≥1) so the machine passes to the potential mapper state 704. At the potential mapper state 704, the detection module analyzes whether the potential mapper (e.g. a malicious entity 110, FIG. 6C) has made more than the ADA set number of connection attempts in the last 30 minutes (where, in this example, the dark-net interval is set to 30 minutes). In our example, if the malicious entity 110 only contacted non-existent address 124 (and no others in the last 30 minutes), then the detection module may loop back to state 704 and wait for more dark-net connection attempts to occur since the ADA limit has not been exceeded.

However, if the malicious entity 110 contacts four non-existent addresses in less than 7 minutes (for instance), then the number of dark-net connection attempts exceeds the ADA limit of 3 in the last 30 minutes. At this point, the machine moves to state 706: reconnaissance occurring. The dark-net detection engine may then report the malicious entity as trying to conduct mapping or reconnaissance as explained above.

However, referring again to state 704, assume that malicious entity contacts non-existent address 124 and then contacts the other three addresses (126, 128, 130) 50 minutes later. In this case, the machine would loop back to state 704. Although the number of dark-net connection attempts was 4, which exceeds the limit of 3 or more, the attempts did not all occur within 30 minutes, the specified interval of time: by the time 126, 128, and 130 were registered, 124 was expired (e.g. removed) because it was older than 30 minutes. In this way, the ADA threshold approach may work as a sliding window where the width of the window corresponds to the dark-net interval.

Figure 8:
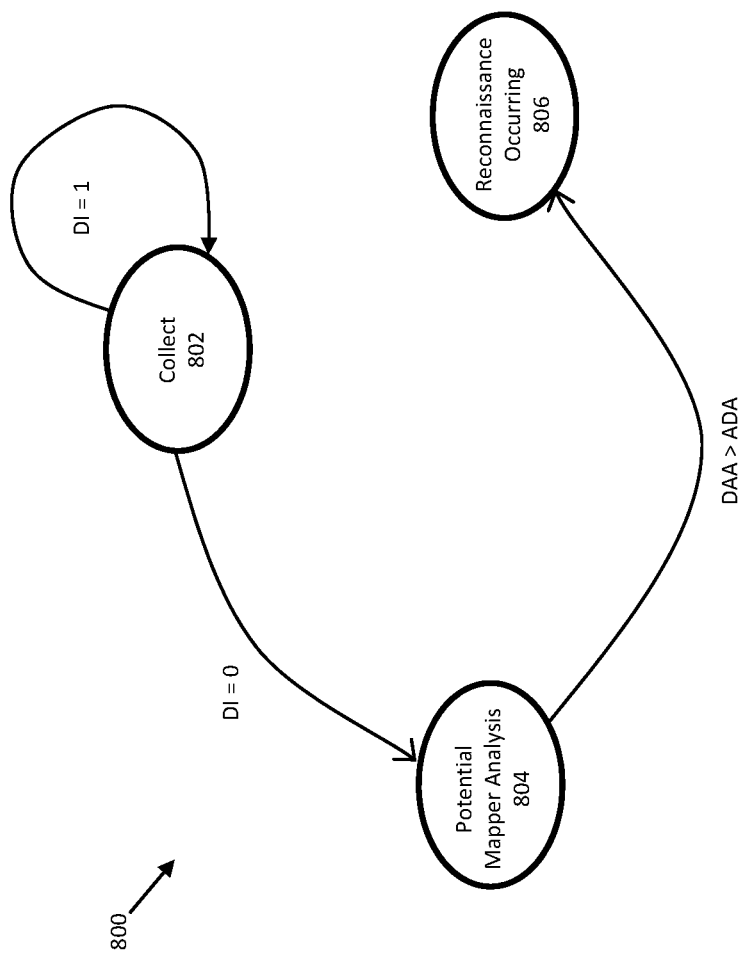
FIG. 8 illustrates a state machine for an approach for how the detection module may implement aspects of the ADA threshold operation, as according to some embodiments.

In some embodiments, a quantized or bucketed approach may be implemented for ADA thresholding. In this approach data is collected for analysis periodically (e.g. when the dark-net interval resets). FIG. 8 illustrates this mechanism as a state machine 800. At the 802 collect state, network traffic is collected in a buffer for later analysis. In some embodiments, so long as the dark-net process is unexpired (e.g. DI=1) the dark-net engine buffers or collects network traffic for later analysis. Once the dark-net interval expires (for example, every 30 minutes), e.g. DI=0, the state machine transitions to a mapper analysis state 804. There, all dark-net connection attempts are aggregated or summed for each host (e.g. Dark-net accessor).

If one or more hosts dark-net connection attempts exceeds the ADA limit (e.g. DAA>ADA) the state machine may transition to a reporting state at 806 where it can be reported with confidence (as evidenced by the multiple connection attempts) that a malicious entity inside the network is performing network reconnaissance.

The systems and methods for dark-net detection described above constitutes an improved approach for detecting reconnaissance behavior. The invention provides an approach that detects reconnaissance by tracking the organization's internal dark-net and detecting attempts to connect to addresses on the dark-net list. By tracking the assets, suspicious activity can be detected as early as possible without false positive alarms. Self-learning is another advantage provided by embodiments of the invention, where the internal network is automatically learned without human coordination, obviating the need for IT staffs to define the "light" and "dark" part of the network.

Figure 9:
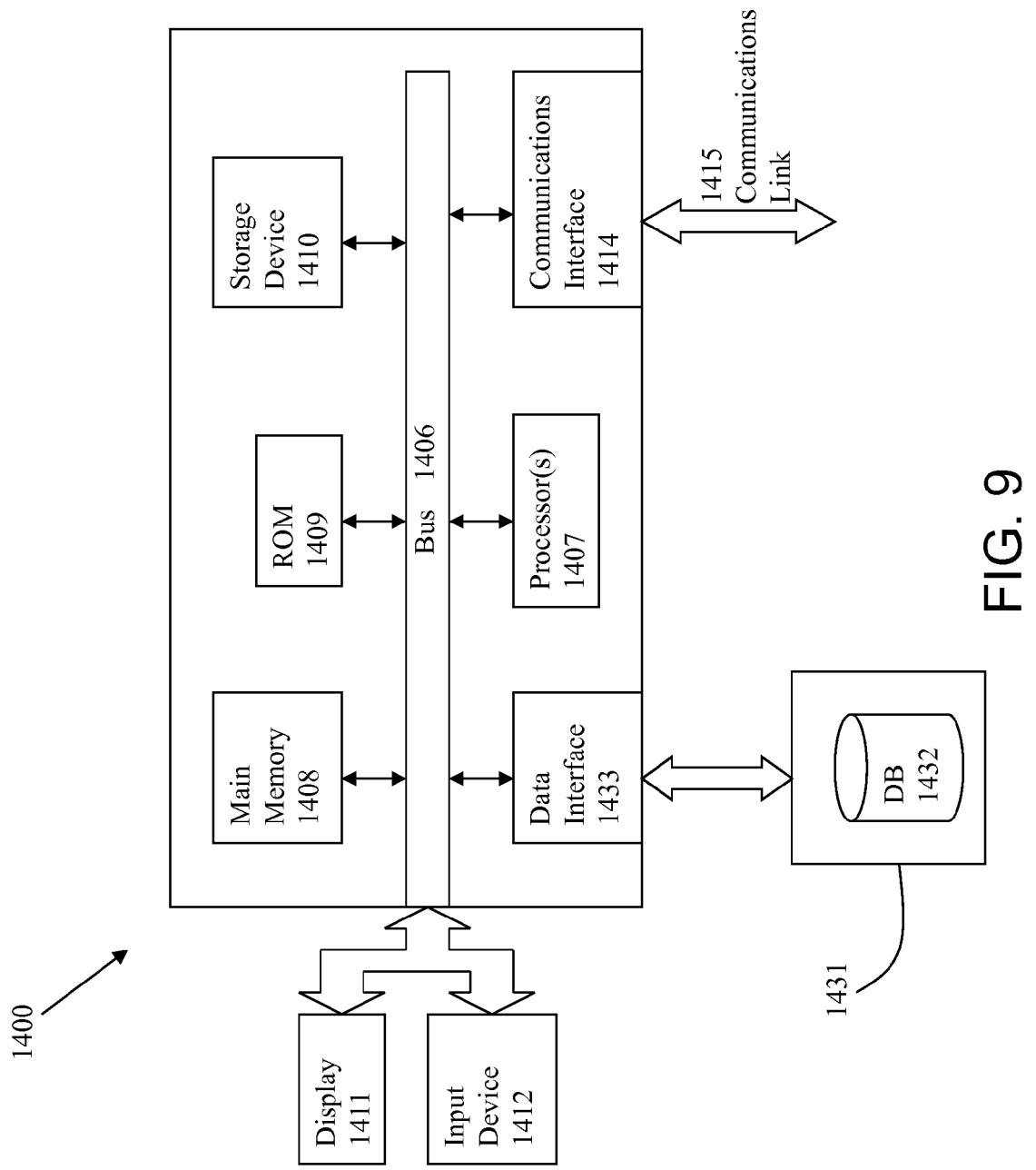
FIG. 9 illustrates example system architecture that may be used to implement a dark-net detection engine, as according to some embodiments.

FIG. 9 is a block diagram of an illustrative computing system 1400 suitable for implementing an embodiment of the present invention for performing intrusion detection. Computer system 1400 includes a bus 1406 or other communication mechanism for communicating information, which interconnects subsystems and devices, such as processor 1407, system memory 1408 (e.g., RAM), static storage device 1409 (e.g., ROM), disk drive 1410 (e.g., magnetic or optical), communication interface 1414 (e.g., modem or Ethernet card), display 1411 (e.g., CRT or LCD), input device 1412 (e.g., keyboard), and cursor control. A database 1432 may be accessed in a storage medium using a data interface 1433.

According to one embodiment of the invention, computer system 1400 performs specific operations by processor 1407 executing one or more sequences of one or more instructions contained in system memory 1408. Such instructions may be read into system memory 1408 from another computer readable/usable medium, such as static storage device 1409 or disk drive 1410. In alternative embodiments, hard-wired circuitry may be used in place of or in combination with software instructions to implement the invention. Thus, embodiments of the invention are not limited to any specific combination of hardware circuitry and/or software. In one embodiment, the term "logic" shall mean any combination of software or hardware that is used to implement all or part of the invention.

The term "computer readable medium" or "computer usable medium" as used herein refers to any medium that participates in providing instructions to processor 1407 for execution. Such a medium may take many forms, including but not limited to, non-volatile media and volatile media. Non-volatile media includes, for example, optical or magnetic disks, such as disk drive 1410. Volatile media includes dynamic memory, such as system memory 1408.

Common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer can read.

In an embodiment of the invention, execution of the sequences of instructions to practice the invention is performed by a single computer system 1400. According to other embodiments of the invention, two or more computer systems 1400 coupled by communication link 1415 (e.g., LAN, PTSN, or wireless network) may perform the sequence of instructions required to practice the invention in coordination with one another.

Computer system 1400 may transmit and receive messages, data, and instructions, including program, i.e., application code, through communication link 1415 and communication interface 1414. Received program code may be executed by processor 1407 as it is received, and/or stored in disk drive 1410, or other non-volatile storage for later execution.

In the foregoing specification, the invention has been described with reference to specific embodiments thereof. It will, however, be evident that various modifications and changes may be made thereto without departing from the broader spirit and scope of the invention. For example, the above-described process flows are described with reference to a particular ordering of process actions. However, the ordering of many of the described process actions may be changed without affecting the scope or operation of the invention. The specification and drawings are, accordingly, to be regarded in an illustrative rather than restrictive sense.

What is claimed is:

1. A system for detecting network reconnaissance in a network having a plurality of host entities, comprising:
 a computer processor to execute a set of program code instructions;
 a memory to hold the program code instructions, in which the program code instructions comprises program code to:
 monitor traffic within an organization's internal network, the internal network communicating with an external network through a network border device;
 parse packets sent by hosts within the internal network;
 analyze packets to identify messages sent by a host within the internal network to an Internet Protocol (IP) address that is not currently being used, wherein a malicious host is identified by determining when the host within the internal network surpasses a threshold of a number of times the host within the internal network does not receive a response from an unused IP address after the host pings the unused IP address;
 generate asset data based at least in part on a successful reciprocal communication between host entities in the internal network;
 generate dark-net connection attempt data for the plurality of host entities; and
 generate report data if a number of attempts by one of the hosts to connect to dark-net objects surpasses the threshold.

2. The system of claim 1, wherein the program code further generates asset data based at least in part on a number of failed connection attempts to a same address inside the internal network.

3. The system of claim 1, wherein the program code generates potential mapper data if the threshold is not surpassed.

4. The system of claim 3, wherein all attempts to connect to dark-net objects is updated in a database as dark-net connection attempt data.

5. The system of claim 4, wherein the program code uses the potential mapper data and the dark-net connection attempt data to determine whether the threshold has been passed.

6. The system of claim 1, wherein the program code waits for an interval of time while generating the asset data.

7. The system of claim 1, wherein the dark-net connection attempt data older than a specified interval of time is expired.

8. The system of claim 1, wherein generating dark-net connection attempt data for the plurality of host entities further comprises checking whether packets in a flow dataset are addressed to addresses not in the asset data.

9. A computer-implemented method for detecting network reconnaissance in a network having a plurality of host entities, comprising:
 monitoring traffic within an organization's internal network, the internal network communicating with an external network through a network border device;
 analyzing packets to identify message messages sent by a host within the internal network to an Internet Protocol (IP) address that is not currently being used, wherein a malicious host is identified by determining whether the host within the internal network surpasses a threshold of a number of times the host within the internal network does not receive a response from an unused IP address after the host pings the unused IP address;
 generating asset data that is based at least in part on a successful reciprocal communication between hosts entities in the internal network, the asset data generated by checking whether communication between hosts is successful;
 generating dark-net connection attempt data for the plurality of host entities; and
 generating report data if a number of attempts by one of the hosts to connect to dark-net objects surpasses the threshold.

10. The method of claim 9, wherein generating asset data further comprises generating asset data based at least in part on a number of failed connection attempts to a same address inside the internal network.

11. The method of claim 9, wherein generating report data further comprises generating potential mapper data if the threshold is not surpassed.

12. The method of claim 11, wherein all attempts to connect to Dark-net objects is updated in a database as dark-net connection attempt data.

13. The method of claim 12, wherein generating dark-net connection attempt data further comprises using the potential mapper data and the dark-net connection attempt data to determine whether the threshold has been passed.

14. The method of claim 9, wherein the dark-net connection attempt data older than a specified interval of time is expired.

15. The method of claim 9, wherein generating dark-net connection attempt data for the plurality of host entities comprises checking whether packets in a flow dataset are addressed to addresses not in the asset data.

16. A computer program product embodied on a non-transitory computer readable medium, the non-transitory computer readable medium having stored thereon a sequence of instructions which, when executed by a processor causes the processor to execute a method for accessing data corresponding to detecting network reconnaissance in a network having a plurality of host entities, comprising:
 monitoring traffic within an organization's internal network, the internal network communicating with an external network through a network border device
 analyzing packets to identify message messages sent by a host within the internal network to an internet protocol (IP) address that is not currently being used, wherein a malicious host is identified by determining whether the host within the internal network surpasses a threshold of a number of times the host within the internal network does not receive a response from an unused IP address after the host pings the unused IP address;
 generating asset data that is based at least in part on a successful reciprocal communication between hosts entities in the internal network, the asset data generated by checking whether communication between hosts is successful;
 generating dark-net connection attempt data for the plurality of host entities; and
 generating report data if a number of attempts by one of the hosts to connect to dark-net objects surpasses the threshold.

17. The computer program product of claim 16, wherein generating asset data further comprises generating asset data based at least in part on a number of failed connection attempts to a same address inside the internal network.

18. The computer program product of claim 16, wherein generating dark-net connection attempt data further comprises generating potential mapper data if the threshold is not surpassed.

19. The computer program product of claim 18, wherein all attempts to connect to Dark-net objects is updated in a database as dark-net connection attempt data.

20. The computer program product of claim 19, wherein generating dark-net connection attempt data further comprises using the potential mapper data and the dark-net connection attempt data to determine whether the threshold has been passed.

* * * * *